United States Patent [19]

Yoneyama et al.

[11] Patent Number: 5,829,665
[45] Date of Patent: Nov. 3, 1998

[54] FLUXLESS SOLDERING PROCESS

[75] Inventors: Takao Yoneyama, Ampachi-gun; Hiroyuki Okada, Okazaki, both of Japan

[73] Assignee: Nippondenso Co., Ltd., Kariya, Japan

[21] Appl. No.: 284,544

[22] PCT Filed: Dec. 9, 1992

[86] PCT No.: PCT/JP92/01611

§ 371 Date: Aug. 9, 1994

§ 102(e) Date: Aug. 9, 1994

[87] PCT Pub. No.: WO94/13595

PCT Pub. Date: Jun. 23, 1994

[51] Int. Cl.$^6$ .................................................. B23K 1/20
[52] U.S. Cl. ........................................................ 228/124.1
[58] Field of Search ............................ 228/124.1, 122.1; 437/901

[56] References Cited

U.S. PATENT DOCUMENTS

| | | | |
|---|---|---|---|
| 4,018,374 | 4/1977 | Lee et al. | 228/124.1 |
| 4,019,388 | 4/1977 | Hall, II et al. | 228/124.1 |
| 4,518,093 | 5/1985 | Gogniat et al. | |
| 4,582,240 | 4/1986 | Lux et al. | 228/121 |
| 4,726,507 | 2/1988 | Landram | 228/124.1 |
| 4,833,920 | 5/1989 | Knecht et al. | 73/717 |
| 4,918,992 | 4/1990 | Mathias | 73/727 |
| 5,055,914 | 10/1991 | Shimizu et al. | 257/750 X |
| 5,061,035 | 10/1991 | Rogers, Jr. | 385/115 |
| 5,289,964 | 3/1994 | Yoneyama et al. | |

FOREIGN PATENT DOCUMENTS

| | | |
|---|---|---|
| 296942 | 6/1988 | European Pat. Off. . |
| 55-122666 | 9/1980 | Japan . |
| 56-145137 | 11/1981 | Japan . |
| 59-217655 | 12/1984 | Japan . |
| 2172876 | 7/1990 | Japan . |
| 3218950 | 9/1991 | Japan . |

OTHER PUBLICATIONS

K. Maruyama, et al., *Functional Coatings*, 1984, pp. 204–206.

*New Engineering Review of Coating*, p. 92, 1989.

*Primary Examiner*—Kenneth J. Ramsey
*Attorney, Agent, or Firm*—Cushman Darby & Cushman IP Group of Pillsbury Madison & Sutro LLP

[57] ABSTRACT

A fluxless soldering process for soldering a pressure sensor unit having a sensor chip incorporating a semiconductor circuit of a large scale integration, for example, to a metal stem without scratching the surface of the chip. For the soldering, a nickel layer and an oxidation-preventing layer are formed on the surface of the glass substrate of the sensor unit. The oxidation-preventing layer acts to prevent the nickel layer from oxidizing. The substrate undergoes a thermal hysteresis before soldering. The thickness of the oxidation-preventing layer is so set that after the thermal hysteresis, movement of nickel atoms of the nickel layer to the top surface of the substrate is suppressed in relation to the thermal hysteresis. The substrate and the stem are heated in a reducing atmosphere to melt a solder foil placed between the substrate and the stem. Thus, the sensor unit is soldered to the stem. The solder-wettability of the soldered surface of the substrate is not deteriorated. Good solder-wettability can be imparted to the soldered surface without the need to increase the load applied to the joint portion during the soldering. Furthermore, since the soldering is effected by heating in a reducing atmosphere, the two surfaces can be soldered together with a high degree of gastightness without using a flux.

5 Claims, 5 Drawing Sheets

FLUXLESS SOLDERING PROCESS

TECHNICAL FIELD

The present invention relates to a fluxless soldering process adapted to be used where minute mating portions are required to be soldered together with a high degree of gastightness without using a flux as encountered in a pressure sensor unit.

BACKGROUND ART

As an example, a pressure sensor unit has a joint portion to be soldered, and this joint portion measures only about 0.5 mm. In addition, a high degree of gastightness such as a leakage of less than $1 \times 10^{-11}$ atm·cc/s is required. In the past, therefore, in order to secure sufficient solder-wettability, a flux has been applied to the soldered joint surface.

However, when a flux is applied and heated, gases are given off from the flux, creating voids in the joint portion. These remaining voids are a main cause of insufficient gastightness in the soldered joint portion. Accordingly, where the joint portion is very small, it is difficult to improve the gastightness in the joint portion. Furthermore, it is necessary to wash away flux residues after soldering. This increases the number of the soldering steps. Also, the use of a detergent made from a Freon is not desirable for protection of environment.

Accordingly, an improved fluxless soldering method has been proposed in Japanese Patent Laid-Open No. 218950/1991. In particular, two members to be bonded together are spaced from each other vertically. The balance between the solder-wettabilities of the bonded members is improved by making use of both a load and the weight of the solder itself which acts to push the solder and cause it to flow. However, where a glass substrate used in a pressure sensor having a sensor chip on which a semiconductor circuit of a large scale integration is integrally formed is bonded to a metal stem by this method, the surface of the sensor chip extends in such a direction that the chip makes contact with a jig during assembly, thus scratching the surface of the sensor chip. This deteriorates the electrical characteristics.

In view of the foregoing, the present invention has been made. It is an object of the invention to provide a fluxless soldering process capable of bonding a pressure sensor unit having a sensor chip incorporating a semiconductor circuit of a large scale integration, for example, to a metal stem without scratching the surface of the sensor chip so as to improve the balance between the solder-wettabilities of both joint surfaces of portions to be soldered.

DISCLOSURE OF THE INVENTION

The above object is achieved by forming a nickel layer for soldering on the surface of a first member to be soldered and an oxidation-preventing layer for preventing the nickel layer from oxidizing. The first member undergoes a thermal hysteresis before the soldering. The thickness of this oxidation-preventing layer is so determined that movement of nickel atoms of the nickel layer toward the top surface of the first member is restricted in relation to the thermal hysteresis. A solder foil is melted by heating it in a reducing atmosphere. In this way, this first member is soldered to a second member.

In this soldering method, even if the first member undergoes the thermal hysteresis, the oxidation-preventing layer overlying the nickel layer is thick enough to effectively prevent nickel atoms of the nickel layer from being diffused up to the top surface of the first member. In consequence, substantially no deterioration in the solder-wettability of the joint surface of the first member takes place.

Accordingly, the solder-wettability of the first member is improved without increasing the load applied to the joint portion during soldering. Also, the wetting of the opposite surface by the solder is promoted. This maintains the balance between the solder-wettabilities of the joint surfaces of the two members which are placed vertically. In this manner, the joint surfaces of the two members to be bonded together are well wetted by the solder. In addition, a soldering operation providing a high degree of gastightness can be realized without using a flux since the soldering operation is carried out while applying heat in a reducing atmosphere.

This eliminates the need to increase the load to the joint portions during the soldering. For example, where a pressure sensor unit having a sensor chip incorporating a semiconductor circuit of a large scale integration, for example, is bonded to a metal stem, it is not necessary to apply a load to the sensor chip placed in a lower position while using the stem as the load or to apply a load using other weight. Hence, the sensor chip surface is prevented from being scratched.

Furthermore, the soldering process can be effected without using a flux. This eliminates a cleaning step which would normally be needed to wash away flux residues after soldering. Therefore, automation of the assembly operation is facilitated. Further, the use of a Freon is dispensed with. This is effective in protecting environment.

BEST MODE FOR CARRYING OUT THE INVENTION

Figure 1:
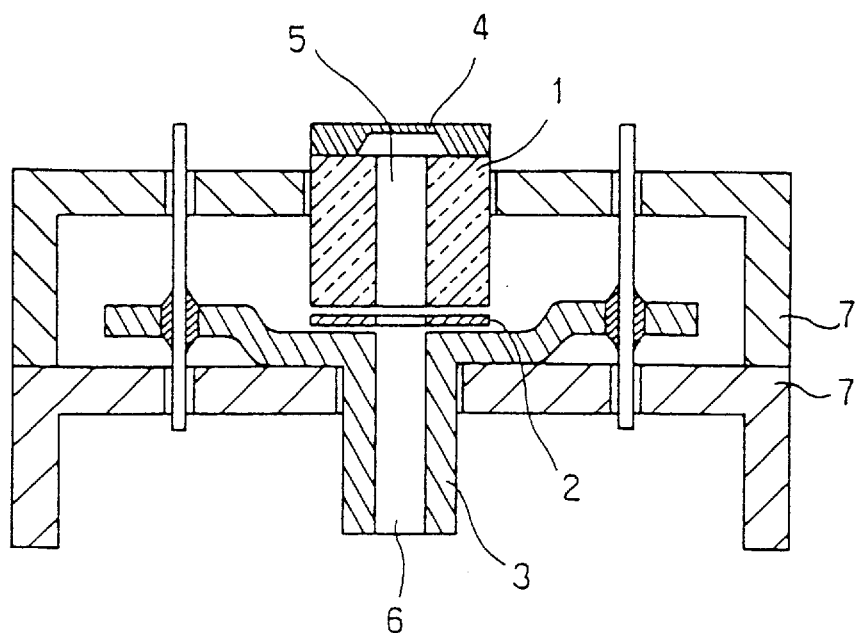
FIG. 1 is a cross-sectional view illustrating a fluxless soldering process according to the invention, the process being used to assemble a pressure sensor unit.

An embodiment of the present invention is described below by referring to the accompanying drawings. In this embodiment, a pressure sensor having joint portions which have very small dimensions and are required to have a high degree of gastightness is assembled. FIG. 1 shows the structure where the joint portions are soldered.

The pressure sensor is completed by bonding a pressure sensor unit to a metal stem 3 consisting, for example, of 42 alloy (Fe 58% and Ni 42%). The pressure sensor unit comprises a sensor chip 4 and a glass substrate 1 on which the chip 4 is mounted, the chip 4 consisting of a semiconductor or the like. A pressure introduction passage 6 is formed along the central axis of the stem 3. A pressure introduction port 5 going to the sensor chip 4 is formed along the central axis of the glass substrate 1. The introduction port 5 and the introduction passage 6 are formed coaxially and in communication with each other. In this structure, a pressure to be measured is introduced into the pressure introduction passage 6 and acts on the diaphragm surface of the sensor chip 4. An integrated semiconductor circuit formed on the chip 4 produces a signal corresponding to the pressure, and this signal is detected.

In the present embodiment, the joint surface of the stem 3 is plated with nickel (Ni) and nickel-boron alloy (Ni-B) in succession. The glass substrate 1 is made of Pyrex glass manufactured by Corning Corp. Ti, Ni, and Au are successively deposited as thin metal film layers on the joint surface of the substrate 1.

When the stem 3 and the glass substrate 1 are bonded together, the stem 3 is placed in position relative to a jig 7 such that the soldered surface of the stem 3 faces upward. Under this condition, a solder foil 2 having a thickness of about 45 pm to 50 pm is placed on the bonded portion of the stem 3. The glass substrate 1 is placed over the foil 2 in such a way that the soldered surface opposite to the surface on which the sensor chip 4 is mounted faces downward.

In this way, an assembly of the stem 3 and the glass substrate 1 is completed by the jig 7. Then, this assembly is heated to 250° C. to 300° C., in a reducing atmosphere where $H_2/(H_2+N_2)$ is in excess of 30%, preferably 30% to 50%, to melt the solder foil 2, whereby the stem and the substrate are soldered together.

As mentioned previously, before the pressure introduction port 5 is provided in position, the Ti layer, the Ni layer, and the Au layer are deposited on the soldered surface (lower side surface in FIG. 1) of the glass substrate 1. The Ti layer acts to bring the glass and the solder joint layer (Ni) into intimate contact with each other. The Ni layer is used for bonding to the solder. The Au layer serves to prevent oxidation of the Ni layer. After the introduction port 5 has been provided in position, the sensor chip 4 is bonded to the top surface of the glass substrate 1 by anodization. This anodization is carried out at 350° C. for 15 minutes, for example. During this anodization, the Ni layer and the Au layer undergo a thermal hysteresis, and diffusion progresses in these Ni and Au layers.

Figure 2A:
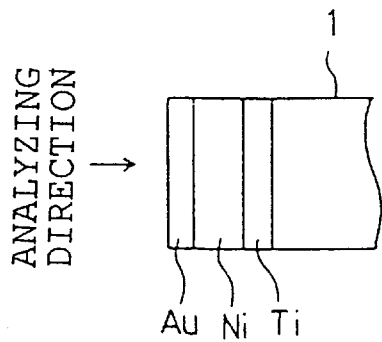
FIGS. 2(A) and 2(B) are diagrams illustrating results of AES (Auger electron spectrometry) analyses of a surface of a glass substrate prior to a thermal hysteresis.
Figure 2B:
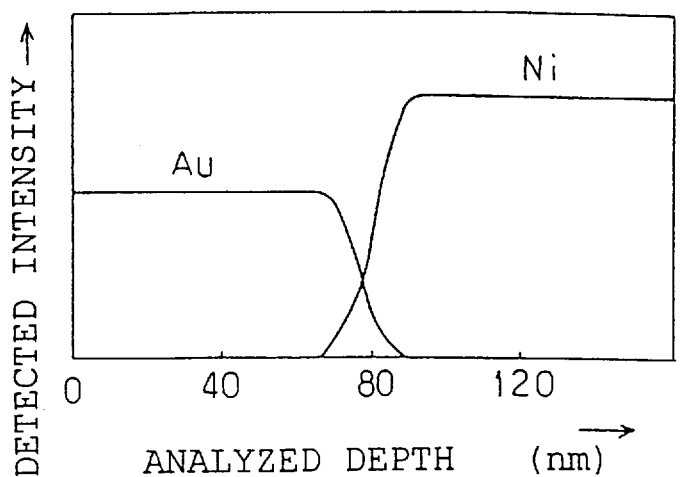
Figure 3A:
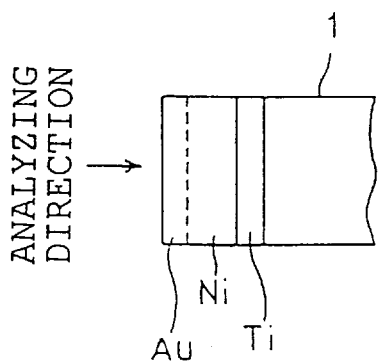
FIGS. 3(A) and 3(B) are diagrams illustrating results of AES analyses of a surface of a glass substrate subsequent to a thermal hysteresis.
Figure 3B:
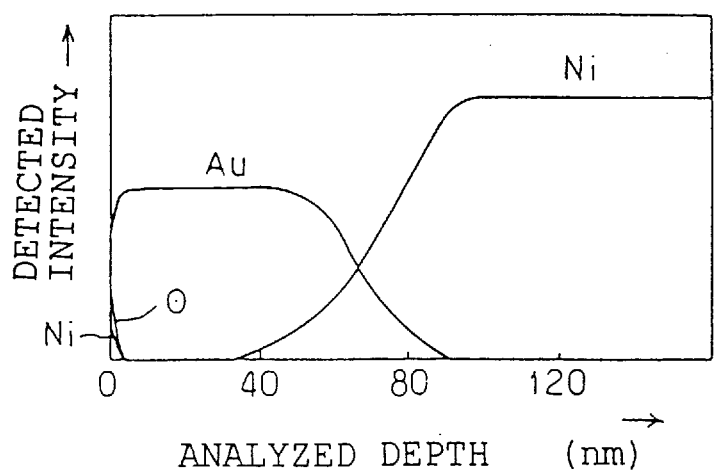

FIGS. 2(A), 2(B), 3(A), and 3(B) show the results of Auger electron spectrometry (AES) analyses of the joint surface of the glass substrate 1 prior to soldering in the conventional structure. FIGS. 2(A) and 2(B) show the results of Auger electron spectrometry analyses prior to bonding utilizing anodization. FIGS. 3(A) and 3(B) show the results of Auger electron spectrometry analyses subsequent to the bonding utilizing anodization. FIGS. 2(A) and 3(A) show the surface structures. FIGS. 2(B) and 3(B) show the results of the investigations in terms of the relation between the depth of analysis and the intensity of detected signals.

As can be seen from these figures, no oxide film is present on the surface of the glass substrate 1 not yet bonded by anodization, the surface including the thin metal films. However, after the bonding by anodization, an oxide film has grown to a thickness of about 1 nm to 1.5 nm even if a cooling atmosphere after the bonding is a reducing atmosphere. Specifically, in the joint surface of the glass substrate 1, Ni atoms are diffused up to the top surface by the thermal hysteresis during the bonding by anodization as described above. The Ni atoms appearing on the surface react with oxygen atoms in later steps, so that the Ni layer is oxidized. If this oxide film is present, the solder-wettability of the glass substrate is deteriorated, as pointed out in the above-cited Japanese Patent Laid-Open No. 218950/1991.

The Au layer is formed on the joint surface of the glass substrate 1 to permit good soldering even in the assembly direction shown in FIG. 1 without the need to adopt the conventional scheme, i.e., the glass substrate 1 is inverted and the stem 3 is placed over the substrate. The present inventors discussed the thickness of this Au layer.

Specifically, the conventional Au layer merely acts to prevent oxidation of the Ni layer. This layer is formed to a thickness of about 80 nm also because the material is a noble metal. In the presents embodiment, the thickness is 150 nm.

Figure 4:
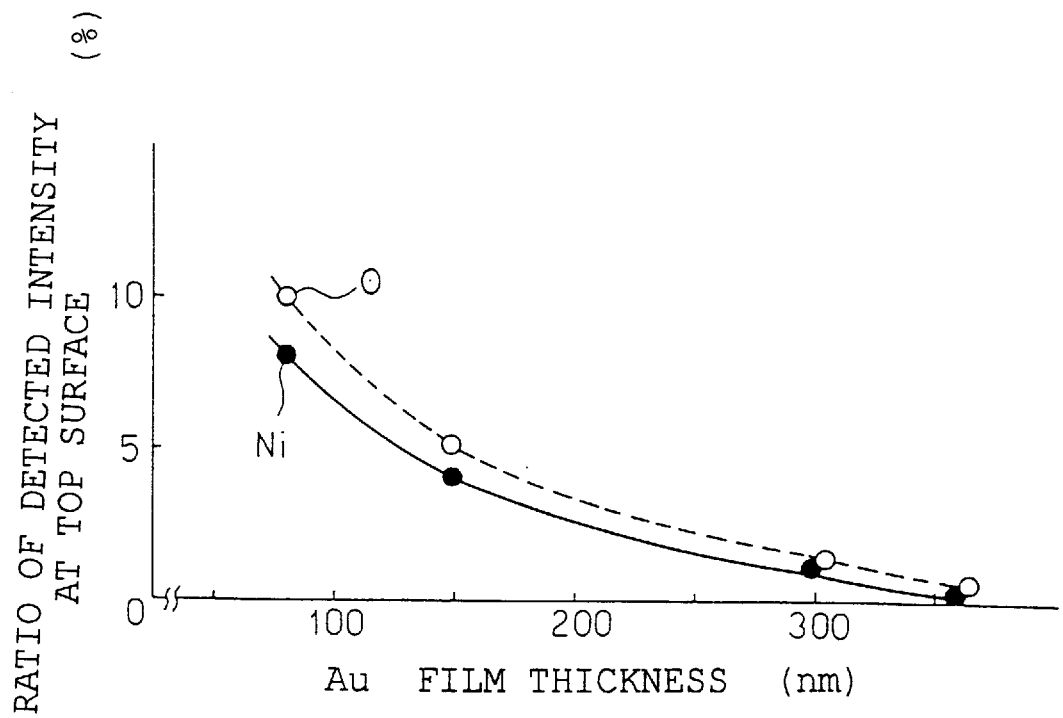
FIG. 4 is a graph showing the relation of the intensities of detected nickel (Ni) and oxygen (O) to the thickness of a film of gold (Au) on a glass substrate.

The increased thickness of the Au layer yields the following advantages. Observation of an Auger spectrum of the soldered surface of the glass substrate 1 after the bonding by anodization shows that as the thickness of the Au film increases, the number of Ni atoms diffused to the top surface decreases. FIG. 4 shows the ratios of detected Ni and O. It can be seen that the number of Ni atoms reaching the top surface and oxidation decrease with increasing the Au film thickness.

Figure 5:
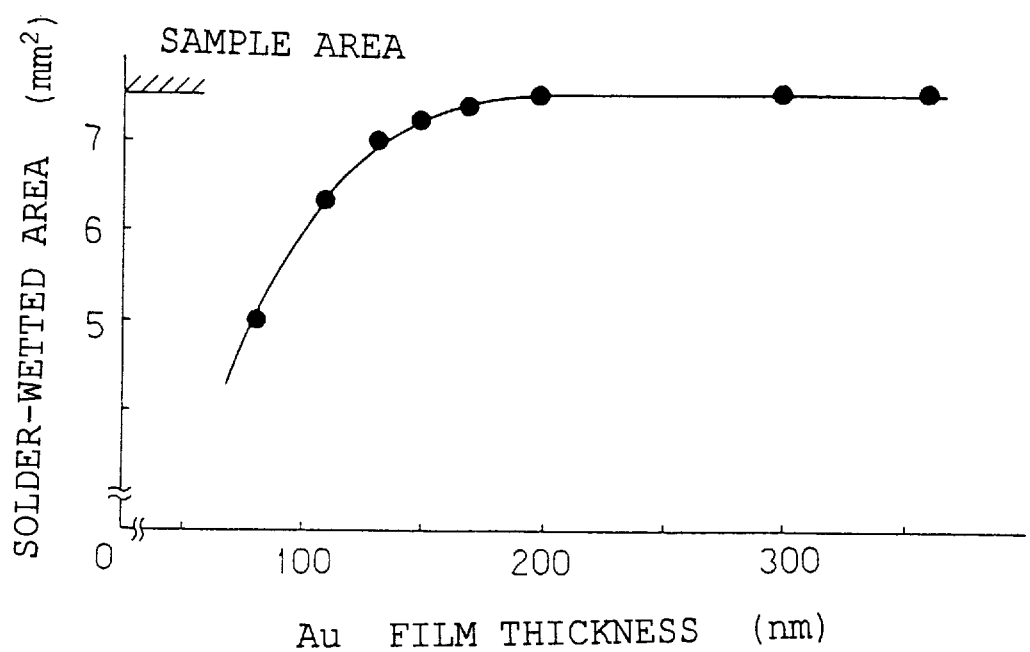
FIG. 5 is a graph showing the relation of the solder-wetted area to the thickness of a film of gold (Au) on a glass substrate.

The joint surface of the glass substrate 1 was placed so as to face upward. The solder foil was placed on the joint surface. The foil and the substrate were heated in a reducing atmosphere where $H_2/(H_2+N_2)$ is 30%. The solder-wetted area is shown in FIG. 5. It can be seen from this graph that as the Au film thickness increases, the solder-wettability is improved. Thus, the solder can be applied to the whole surface of the joint surface.

Figure 6:
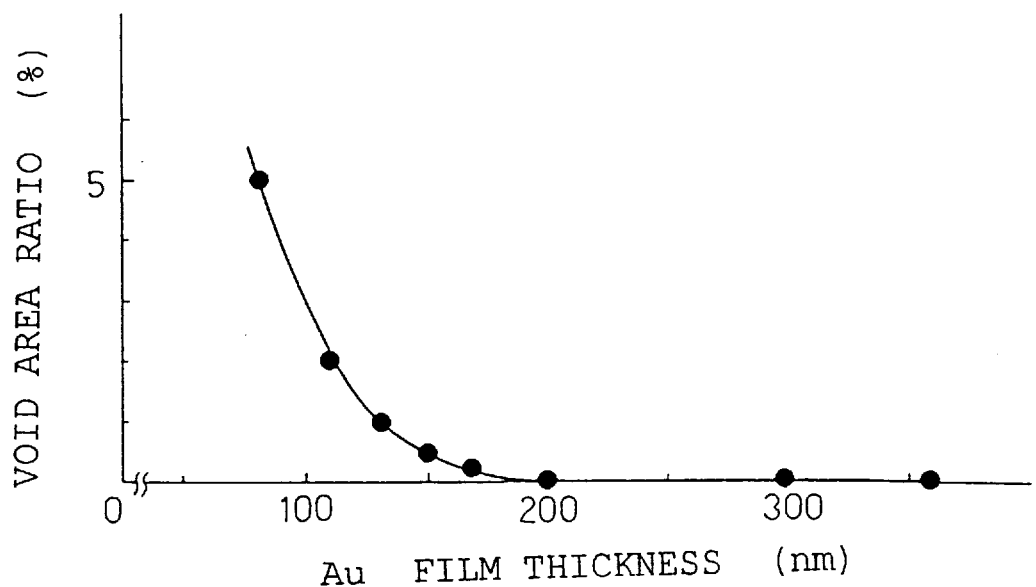
FIG. 6 is a graph showing the relation of the void area ratio of a soldered portion to the thickness of a film of gold (Au) on a glass substrate.

The glass substrate 1, the solder foil 2, and the stem 3 were assembled in the assembly direction shown in FIG. 1. The assembly was heated in a reducing atmosphere. Under this condition, the void area ratio of the soldered portion is shown in FIG. 6. It can be seen from FIG. 6 that as the solder-wettability of the glass substrate 1 shown in FIG. 5 is improved and as the Au film thickness is increased, the void area ratio decreases. The surface of the stem 3 was plated with Ni and then with a Ni-B alloy that is cheaper than Au. That is, the top layer was made from a Ni-B plating layer. The inventors have found that even if the load applied by the glass substrate 1 and also by the sensor chip 4 is as small as 0.05 gf (i.e., the load acting on the joint portion), the solder-wettability of the Ni-B plating layer is improved because the solder-wettability of the opposite glass substrate 1 is improved.

Figure 7:
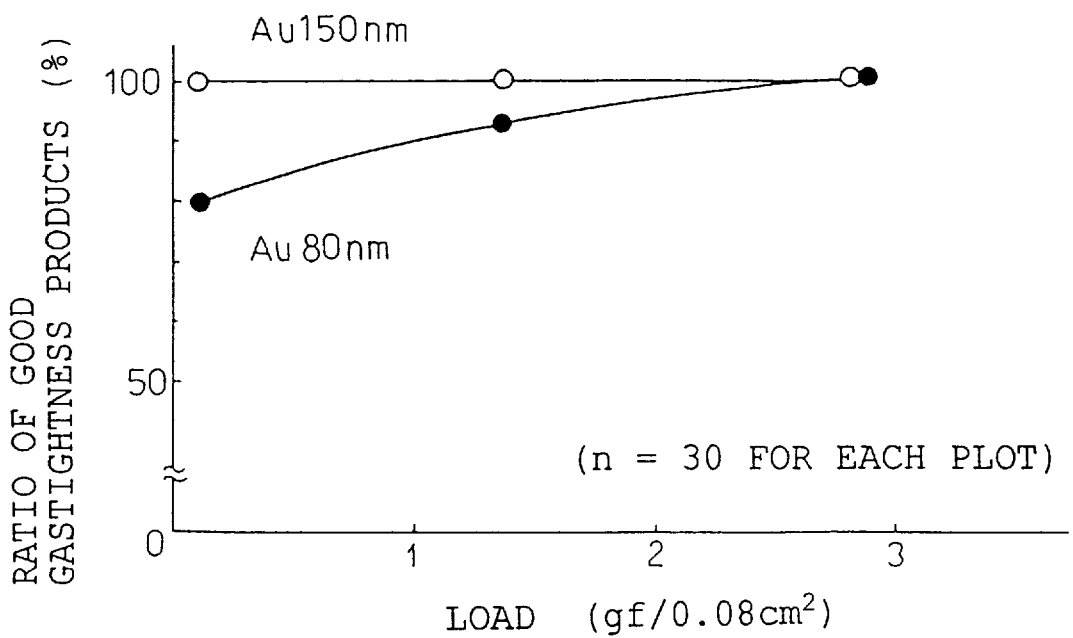
FIG. 7 is a graph showing the relation of the ratio of soldered products of good gastightness to the load applied during soldering.

FIG. 7 shows the relation of the ratio of finished, soldered products of good gastightness to the load applied during the soldering. process. With respect to the gastightness, those finished products whose leakage amounts measured by a leakage test, using a radioisotope, are less than $1 \times 10_{-11}$ atm·cc/s are regarded as acceptable. The top surface of the stem 3 is plated with a Ni-B alloy.

In the present embodiment, the thickness of the Au layer on the joint surface of the glass substrate 1 is 150 nm. As can be seen from FIG. 7 that mere application of a load 0.05 gf/0.08 $cm^2$ yields the same favorable effects as the conventional method in which both application of a load 2.9 gf/0.08 cm and an Au film having a thickness of 80 nm are used. This load 2.9 gf/0.08 cm² is a load applied to the joint portion in the known inverting method described in the above-cited Japanese Patent Laid-Open No. 218950/1991 where the stem is placed over the substrate.

Specifically, in the present embodiment, the solder-wettability of the glass substrate surface is improved without utilizing either the load applied by the stem or a separate weight which acts to push the solder and cause it to flow. In this way, the balance between the solder-wettability of the joint surface of the glass substrate 1 and the solder-wettability of the joint surface of the stem 3 can be improved, the substrate 1 being located above the stem 3. This assures good soldering. Also, even if the surface of the stem 3 is plated with a cheaper Ni-B alloy, the wettability is improved by the weight of the solder itself and the balance between the wettabilities of the joint surfaces is improved, although the solder wets the Ni-B plating layer more slowly than the Au layer. As a result, uniform solder-wetting can be accomplished. This also permits good soldering. In this way, a fluxless soldering process capable of assembling a pressure sensor with a high degree of gastightness and high bonding strength without scratching the surface of the sensor chip 4 having a semiconductor circuit of a large scale integration can be realized.

Figure 8:
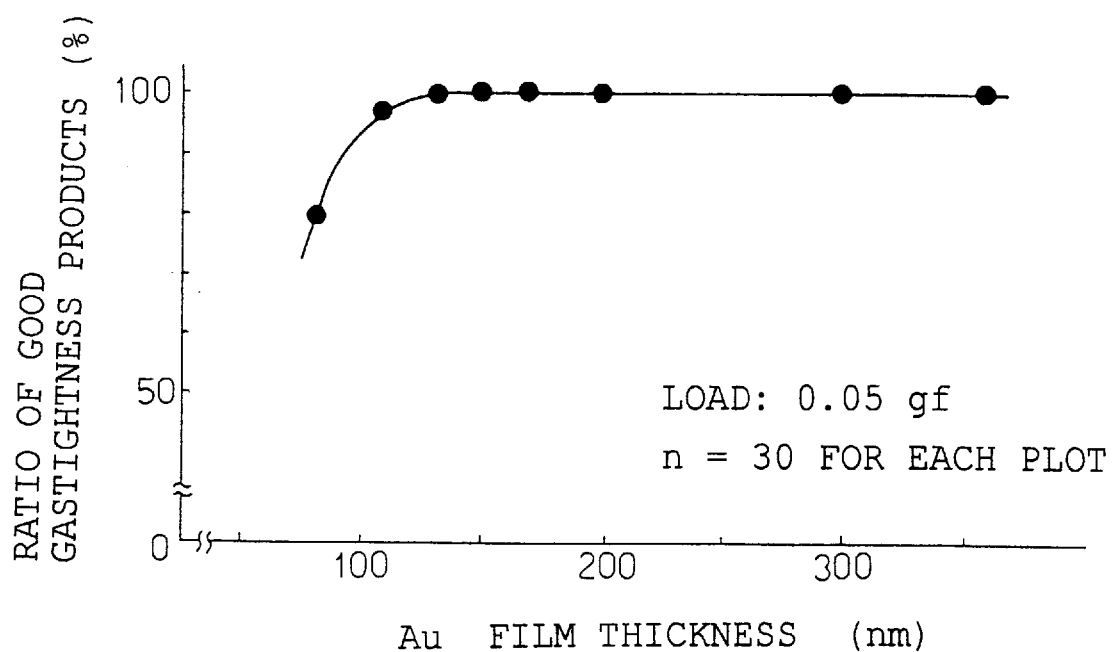
FIG. 8 is a graph showing the relation of the ratio of soldered products of good gastightness to the thickness of a film of gold (Au) on a glass substrate.

FIG. 8 shows the relation of the ratio of finished, soldered products of good gastightness to the thickness of a film of gold (Au) on the glass substrate 1. The top surface of the stem 3 is plated with a Ni-B alloy. The load is 0.05 gf/0.08 cm².

It can be seen from FIG. 8 that good gastightness can be obtained where the thickness of the Au film is set to about 130 nm. If the solder contains more than 4% by weight of Au, then an Au-Sn alloy is grown excessively, thus deteriorating the strength. Thus, it is considered that the upper limit of the thickness of the Au layer is about 360 nm. This is based on the assumption that in the above embodiment, the solder on the joint portion having a thickness of about 24 pm after bonding contains 4% by weight of Au. That is, in the above embodiment, the thickness of the Au film is 150 nm. According to the present invention, however, the Au film can be set between about 130 nm and 360 nm.

In the embodiment described above, during the assembly operation, the component placed on the lower side has a larger surface area and slightly inferior in solder-wettability because of the use of the Ni-B and Ni plating layers. In this case, the solder-wettability of the joint surface of the upper component having a smaller surface area should be improved. However, where the lower component has a larger surface area and better solder-wettability, e.g., where the component is plated with Au, means for restricting the portion of the lower component wetted by the solder to the joint between the two components might be provided to prevent the solder from flowing an excessive distance, which would otherwise make the solder layer too thin. Examples of the restricting means include a dam, a barrier, and a groove for stopping overflow of the solder and partial plating.

INDUSTRIAL APPLICABILITY

As described thus far, the novel fluxless soldering process can be effectively applied to a soldering operation where a minute joint surface should be soldered with a high degree of gastightness and high bonding strength. For example, the invention can be effectively applied to assembly of a pressure sensor.

What is claimed is:

1. A fluxless soldering process for bonding together a first and a second members, said first member having a surface on which a nickel layer and an oxidation-preventing layer are formed, said oxidation-preventing layer acting to prevent oxidation of said nickel layer, said surface of said first member undergoing a thermal hysteresis before a soldering step, said process comprising the steps of:

forming said oxidation-preventing layer by applying a gold film to a thickness of about 130 nm to 360 nm such that movement of nickel atoms of said nickel layer to a top surface of said first member is suppressed after said thermal hysteresis;

placing said surface of said first member opposite to said second member via a solder foil, wherein said surface of said first member on which said oxidation-preventing layer is formed is narrower than a corresponding bonding surface of said second member, and wherein during said step of placing said surface of said first member opposite to said second member via a solder foil, said second member is placed in a vertically lower position than said first member; and heating said first and second members in a reducing atmosphere so as to melt said solder foil, whereby bonding together said first and second members, and wherein said corresponding bonding surface of said second member is inferior in solder-wettability to said corresponding bonding surface of said first member after said oxidation-preventing layer is subjected to thermal hysteresis and said corresponding bonding surface of said second member is plated with a nickel-boron alloy.

2. A fluxless soldering process for soldering together a glass member and a metal member, comprising the steps of:

forming a nickel layer on a first surface of said glass member;

forming a gold layer to a thickness of about 130 nm to 360 nm on said nickel layer;

bonding a silicon chip to a second surface of said glass member by anodization;

placing said first surface of said glass member on said metal member via a solder foil such that said first surface acts as a soldered surface, wherein said metal member has a surface larger than said first surface of said glass member, said surface of said metal member is inferior in solder-wettability to said gold coated first surface of said glass member, and said surface of said metal member is plated with a nickel-boron alloy; and heating said glass member and said metal member in a reducing atmosphere so as to melt said solder foil, whereby soldering together said glass member and said metal member.

3. A fluxless soldering process for bonding together first and second members, said first member having a surface on which a nickel layer and an oxidation-preventing layer are formed, said oxidation-preventing layer acting to prevent oxidation of said nickel layer, said surface of said first member undergoing thermal hysteresis before a soldering step, said process comprising the steps of:

forming said oxidation-preventing layer by depositing a gold film to a thickness of about 130 nm to 360 nm such that movement of nickel atoms of said nickel layer to a top surface of said first member is suppressed after said thermal hysteresis;

placing said surface of said first member opposite to said second member via a solder foil; and heating said first and second members in a reducing atmosphere to melt said solder foil, thereby bonding together said first and second members, wherein a bonding surface of said second member is inferior in solder-wettability to a corresponding bonding surface of said first member after said oxidation-preventing layer is subjected to thermal hysteresis, and wherein said corresponding bonding surface of said second member is plated with a nickel-boron alloy.

4. A fluxless soldering process for soldering together a glass member and a metal member, comprising the steps of:

forming a nickel layer on a first surface of said glass member;

forming a gold layer to a thickness of about 130 nm to 360 nm on said nickel layer;

bonding a silicon chip to a second surface of said glass member by anodization;

placing said first surface of said glass member on said metal member via a solder foil such that said first surface acts as a soldered surface; and heating said glass member and said metal member in a reducing atmosphere so as to melt said solder foil, thereby soldering together said glass member and said metal member, wherein said metal member has a surface larger than said first surface of said glass member, wherein said surface of said metal member is inferior in solder-wettability to said gold coated first surface of said glass member, and wherein said surface of said metal member is plated with a nickel-boron alloy.

5. A fluxless soldering process for bonding together first and second members, said first member having a surface on which a nickel layer and an oxidation-preventing layer are formed, said oxidation-preventing layer acting to prevent oxidation of said nickel layer, said surface of said first member undergoing a thermal hysteresis before a soldering step, said process comprising the steps of:

depositing as said oxidation-preventing layer a gold film to a thickness of at least 130 nm selected such that movement of nickel atoms of said nickel layer to a top surface of said first member is suppressed after said thermal hysteresis;

placing said surface of said first member opposite to said second member via a solder foil; and heating said first and second members in a reducing atmosphere so as to melt said solder foil, thereby bonding together said first and second members, wherein said thickness of said gold film formed is selected such that gold atoms contained in a solder after said bonding is less than 4% by weight, wherein a corresponding bonding surface of said second member is inferior in solder-wettability to said top surface of said first member after said oxidation-preventing layer is subjected to thermal hysteresis, and wherein said corresponding bonding surface of said second member is plated with a nickel-boron alloy.

* * * * *